United States Patent
Hidaka et al.

(10) Patent No.: US 7,248,016 B2
(45) Date of Patent: Jul. 24, 2007

(54) MOTOR CONTROLLER AND STEERING DEVICE

(75) Inventors: Kenichiro Hidaka, Chiga-gun (JP); Mikihiro Hiramine, Kariya (JP); Motoshi Kawai, Anjo (JP); Toshio Tsutsui, Takahama (JP); Masahiro Miyata, Kariya (JP); Takahiro Kojo, Gotenba (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/268,542

(22) Filed: Nov. 8, 2005

(65) Prior Publication Data

US 2006/0113937 A1 Jun. 1, 2006

(30) Foreign Application Priority Data

Nov. 30, 2004 (JP) .............................. 2004-347099

(51) Int. Cl.
*H02P 23/00* (2006.01)
*H02P 25/00* (2006.01)
*H02P 27/00* (2006.01)
*H02P 27/04* (2006.01)

(52) U.S. Cl. ...................... 318/811; 318/432; 318/434; 318/599

(58) Field of Classification Search ..................... None
See application file for complete search history.

(56) References Cited

FOREIGN PATENT DOCUMENTS

| JP | A-2000-85610 | 3/2000 |
|---|---|---|
| JP | A-2002-10685 | 1/2002 |

*Primary Examiner*—Lincoln Donovan
*Assistant Examiner*—Erick Glass
(74) *Attorney, Agent, or Firm*—Posz Law Group, PLC

(57) ABSTRACT

A motor controller including an inverter including plural switching elements that are subjected to PWM control to generate sine waves of plural phases, a motor including a stator coil supplied with the sine waves thus generated so that rotational magnetic field is generated in the stator coil, and a rotor that is rotationally driven by the action of the rotational magnetic field generated by the stator coil, a storage unit for detecting the sine waves of the respective phases generated in the inverter and storing a correction amount for each phase that is calculated on the basis of the detection result so that the sine waves of the respective phases are coincident with one another and a correcting unit for correcting a PWM signal for carrying out the PWM control on the switching elements on the basis of the correction amount thus calculated.

13 Claims, 5 Drawing Sheets

MOTOR CONTROLLER AND STEERING DEVICE

CROSS REFERENCE TO RELATED APPLICATION

This application is based upon, claims the benefit of priority of, and incorporates by reference the contents of Japanese Patent Application No. 2004-347099 filed on Nov. 30, 2004.

TECHNICAL FIELD

The technical field relates generally to a motor controller for a control driven by an inverter, and a steering device.

BACKGROUND

JP-A-2002-10685 (patent document 1) discloses a related art time compensation control for a motor driven by an inverter. The motor control device of this publication provides a compensation amount for a dead time occurring due to PWM control to an PWM signal for driving an inverter. According to this motor control device, a dead time compensation gain is calculated in accordance with a torque amount calculated on the basis of a torque current instruction value, and the compensation gain thus calculated is multiplied by the compensation amount described above to correct the PWM signal. Accordingly, it is possible to smoothen the PWM signal to be transmitted to the inverter, so that it is possible to suppress the current variation of the motor and suppress the torque variation of the motor.

In addition to the above patent document 1, JP-A-2000-85610 (patent document 2) discloses another related art in which a steering device is equipped with a transmission ratio varying mechanism for varying the transmission ratio between a steering angle of a steering wheel and a turning angle of a steered wheel, and the transmission ratio varying mechanism is applied to a motor.

If some dispersion exists in electrical characteristic values of switching elements provided to the inverter, even when a dead time compensation gain is settled and the compensation amount of the dead time is multiplied by the gain to correct the PWM signal, the wave height and waveform of a sine wave of each phase generated by the inverter are not coincident with those of a reference sine wave, surge occurs in torque current and torque variation occurs.

Furthermore, when the motor disclosed in the patent document 2 is driven by using the above motor controller, torque variation occurs in the motor for the above reason, and this torque variation is transmitted to the steering wheel, so that a driver may have an uncomfortable feeling. The same symptom may occur in an electrical power steering in which an auxiliary mechanism for assisting the steering force of a steering wheel is applied to a motor.

SUMMARY

In view of the above problem, it is an object to provide a motor controller that can suppress torque variation.

Furthermore, it is another object to provide a steering device that can suppress vibration of a steering wheel associated with torque variation of a motor.

In order to attain the above objects, a motor controller according to a first aspect comprises an inverter including plural switching elements that are subjected to PWM control to generate sine waves of plural phases; a motor including a stator coil supplied with the sine waves thus generated so that a rotational magnetic field is generated in the stator coil, and a rotor that is rotationally driven by the action of the rotational magnetic field generated by the stator coil; a storage unit for detecting the sine waves of the respective phases generated in the inverter and storing a correction amount for each phase that is calculated on the basis of the detection result so that the sine waves of the respective phases are coincident with one another; and a correcting unit for correcting a PWM signal for carrying out the PWM control on the switching elements on the basis of the correction amount thus calculated.

According to another aspect, a motor controller comprises an inverter including plural switching elements that are subjected to PWM control to generate sine waves of plural phases; and a motor including a stator coil supplied with the sine waves thus generated so that a rotational magnetic field is generated in the stator coil, and a rotor that is rotationally driven by the action of the rotational magnetic field generated by the stator coil, wherein the switching elements are grouped in accordance with a predetermined range of electrical characteristic values, and the inverter is constructed by using the switching elements belonging to the same group.

According to the above aspects, the sine waves of the respective phases generated by the inverter can be made coincident with one another, so that the surge of the torque current can be suppressed and the torque variation of the motor can be suppressed, thereby achieving the above objects.

According to another aspect, the correction amount may be calculated so that the sine wave of each phase is coincident with a reference sine wave different from the sine waves of the respective phases. Accordingly, the surge of the torque current caused by the dispersion of the electrical characteristic value among the switching elements can be suppressed while outputting a desired motor output.

According to another aspect, the correction amount may be calculated so that one of the sine waves of the respective phases is set as a reference sine wave and the sine waves of the other phases are coincident with the reference sine wave.

The surge of the torque current caused by the dispersion of the electrical characteristic value among the switching elements can also be suppressed by setting one of the sine waves of the respective phases as a reference sine wave and correcting the sine waves of the remaining phases on the basis of the reference sine wave.

According to another aspect, the correction amount may contain an offset value for offsetting a level at which the polarity of the sine wave of each phase is changed so that the absolute values of the peak values at the positive and negative polarity sides of the sine wave from the level concerned are substantially equal to each other, and a gain that is set so that the peak values at the positive and negative polarity sides of the sine wave are coincident with the respective peak values of the reference sine wave.

Accordingly, the offset value and the gain are calculated as the correction amount on the basis of the peak value of the sine wave of each phase that has the strongest effect on the torque of the motor, so that the sine wave of each phase can be made coincident with the waveform of the reference sine wave easily and efficiently and the surge of the torque current can be suppressed.

As the motor controller having the inverter is known a motor controller having a device for preventing short-circuiting when transistors of upper and lower arms of the inverter are subjected to switching control, which is a dead time compensating device. The sine wave corrected by the dead time compensating device has a feature that the distortion is largest in the neighborhood of the zero cross point and smallest in the neighborhood of the peak value. According to the aspect, the offset value and the gain as the correction amount are calculated on the basis of the peak value at which the distortion of the sine wave due to the correction is smallest. Therefore, even in the motor controller having the dead time compensating device, the sine wave of each phase can be easily and efficiently made coincident with the waveform of the reference sine wave, and the surge of the torque current can be suppressed.

According to another aspect, the correction amount may be calculated on the basis of the sine wave under the state that the rotor of the motor is locked.

An induced voltage occurs in the stator coil of the motor so that the phase of the induced voltage progresses with respect to the interlinkage magnetic flux by 90 degrees when the rotor of the motor is rotated. The phases of the sine waves of the respective phases generated by the inverter may be displaced or the like by the induced voltage occurring in the stator coil. On the other hand, according to the aspect, the sine waves of the respective phases generated by the inverter are detected to calculate the correction amount under the state that the rotation of the rotor is stopped. Therefore, it is unnecessary to pay attention to the induced voltage occurring in the stator coil and thus the correction amount can be easily calculated.

According to another aspect, the correction amount may be calculated only once before shipping and stored in the storage unit, and the correcting unit may correct the PWM signal on the basis of the correction amount at all times.

It is known that the electrical characteristic value of the switching element is varied in accordance with the surrounding atmosphere, for example, temperature or the like. According to the aspect, the correction amount is calculated in a factory or the like in which the surrounding atmosphere can be relatively fixed before the motor controller is shipped from the factory or the like. Accordingly, the correction amount can be accurately calculated.

According to another aspect, the motor controller is further equipped with a correction amount calculating unit for calculating the correction amount, the correction amount is calculated and stored in the storage unit every time the motor is started, and the correcting unit corrects the PWM signal on the basis of the correction amount. Accordingly, it is possible to deal with an aging of electrical characteristic values of switching elements.

According to another aspect, the correcting unit carries out gain-based gain correction on the PWM signal to calculate a gain-corrected PWM signal, and when the polarity of the gain-corrected PWM signal is different from the polarity of the PWM signal before the gain correction, the correcting unit carries out clamp processing for nullifying the value of a portion at which the polarity of the gain-corrected PWM signal is different, thereby calculating a clamp-processed PWM signal.

When the gain correction is carried out with a predetermined gain, there is a case where the positive and negative polarities of the PWM signal are alternately varied in the neighborhood of a switching position of the polarity of the PWM signal. For example, the polarity of the PWM signal is varied like negative polarity—positive polarity—negative polarity—positive polarity. When the positive and negative polarities of the PWM signal are alternately varied as described above, the current supply direction to the motor is switched every time the polarity is varied, so that torque variation may occur.

On the other hand, according to the aspect, the clamp processing is carried out to nullify the value of the portion at which the polarity of the gain-corrected PWM signal after the gain correction is different from the polarity of the PWM signal before the correction, so that the alternate variation of the positive and negative polarities in the neighborhood of the polarity switching position is prevented, and thus occurrence of torque variation in the neighborhood of the polarity switching position can be suppressed.

According to another aspect, after the clamp-processed PWM signal is calculated, the correcting unit may carry out offset correction based on an offset value to calculate an offset-corrected PWM signal.

In the aspect, when the clamp processing is carried out, the position at which the polarity of the gain-corrected PWM signal is switched, that is, the zero position is set as a judgment reference. Accordingly, the offset correction is carried out after the clamp processing is carried out. Therefore, the PWM signal can be corrected without changing the judgment reference of the clamp processing, so that the processing of the correcting unit can be simplified.

According to another aspect, the sine wave may be a voltage value output to the terminal of each phase. It is generally known that when an electrical quantity flowing in a circuit is measured, it is easier to measure a voltage value than to measure a current value. Accordingly, according to this aspect, an electrical quantity output from the inverter to the terminal of each phase is taken out as a voltage value, and thus the sine wave can be easily measured.

According to another aspect, the sine wave may be a current value output to each phase. An electrical quantity output from the inverter to each phase is taken out as a current value.

According to another aspect, the electrical characteristic value may be a threshold voltage of each switching element, the resistance value of a resistor connected to a control terminal (gate terminal in MOSFET) of each switching element, and/or the capacitance of a capacitor or parasitic capacitance corresponding to the internal capacitance of each switching element.

The inventor has found through experiments, etc. that when there is some dispersion in the threshold value of each switching element provided to the inverter, the resistance value of the resistor connected to the control terminal (gate terminal in MOSFET) of each switching element, the capacitance of each capacitor or the parasitic capacitance of each switching element, dispersion also occurs in the ON-OFF switching timing of each switching element and the voltage value and current value flowing in each phase. In consideration of this fact, the inverter is constructed by the switching elements, the resistors and the capacitors under the condition that the threshold voltage of each switching element, the resistance value of each resistor connected to each control terminal (gate terminal in MOSFET), the capacitance of each capacitor or the parasitic capacitance of each switching element is within a predetermined range, whereby the sine waves of the respective phases generated by the inverter can be made coincident with one another.

According to another aspect, in a steering device for driving a motor on the basis of a steering state detected by a steering state detecting unit, and actuating a transmission ratio varying mechanism for varying the transmission ratio between a steering angle of a steering wheel and a turning angle of a steered wheel, or an auxiliary mechanism for assisting the steering force of the steering wheel, the motor is driven by the motor controller according to any one of the above aspects.

Accordingly, the torque variation of the motor provided to the steering device is suppressed, so that vibration of the steering wheel due to the torque variation can be suppressed and the steering feeling of a driver can be enhanced. Therefore, the above object can be achieved.

BRIEF DESCRIPTION OF THE DRAWINGS

The above and other objects, features and advantages will become more apparent from the following detailed description made with reference to the accompanying drawings. In the drawings.

DETAILED DESCRIPTION OF THE PREFERRED EMBODIMENTS

Preferred embodiments will be described with reference to the accompanying drawings.

Embodiments of a motor controller and a steering device will be described with reference to the accompanying drawings. The following embodiments will be described by using a steering device equipped to a vehicle such as a car or the like as a steering device.

First Embodiment

Figure 1:
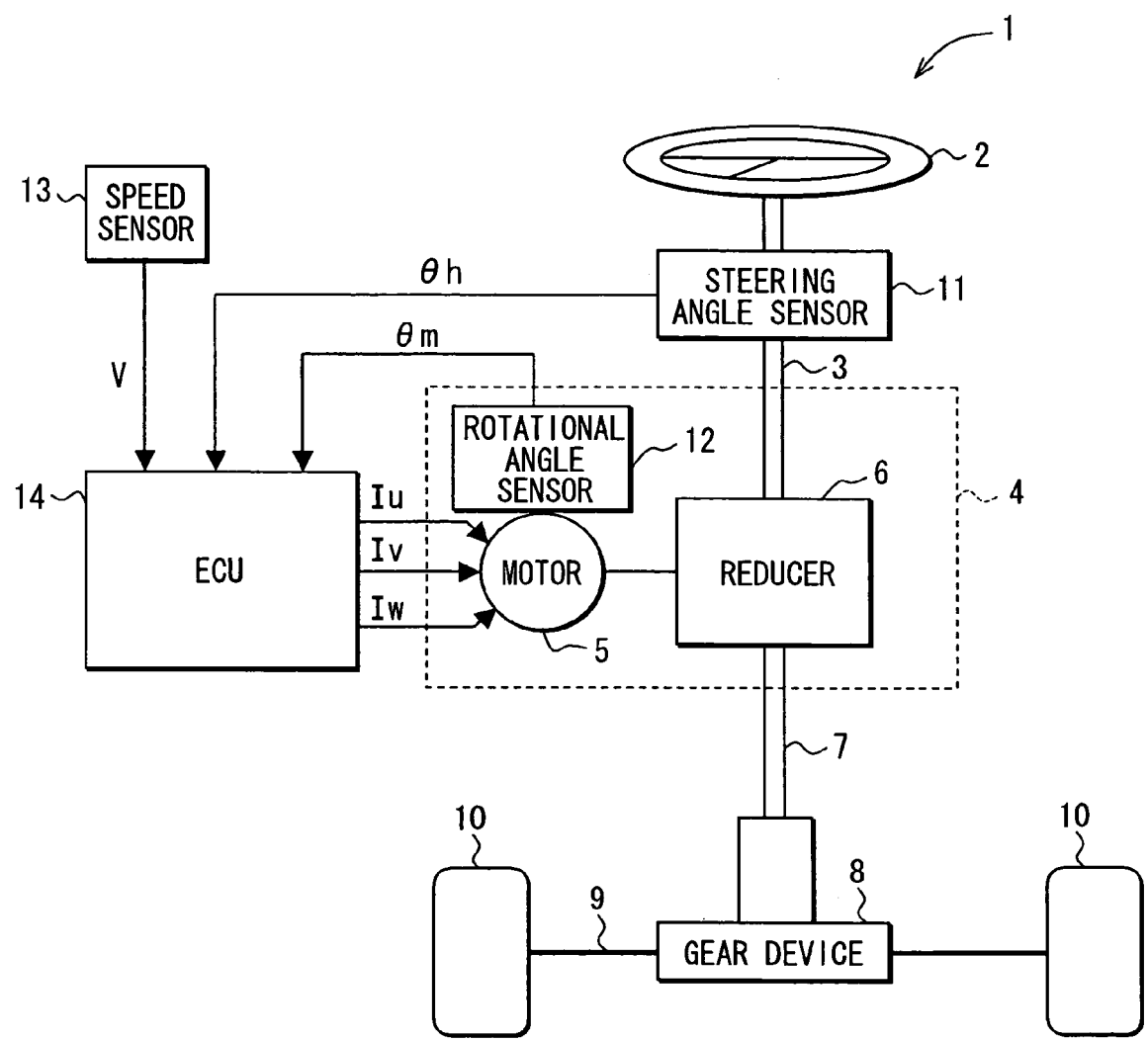
FIG. 1 is a block diagram showing the construction of a steering device.
Figure 2:
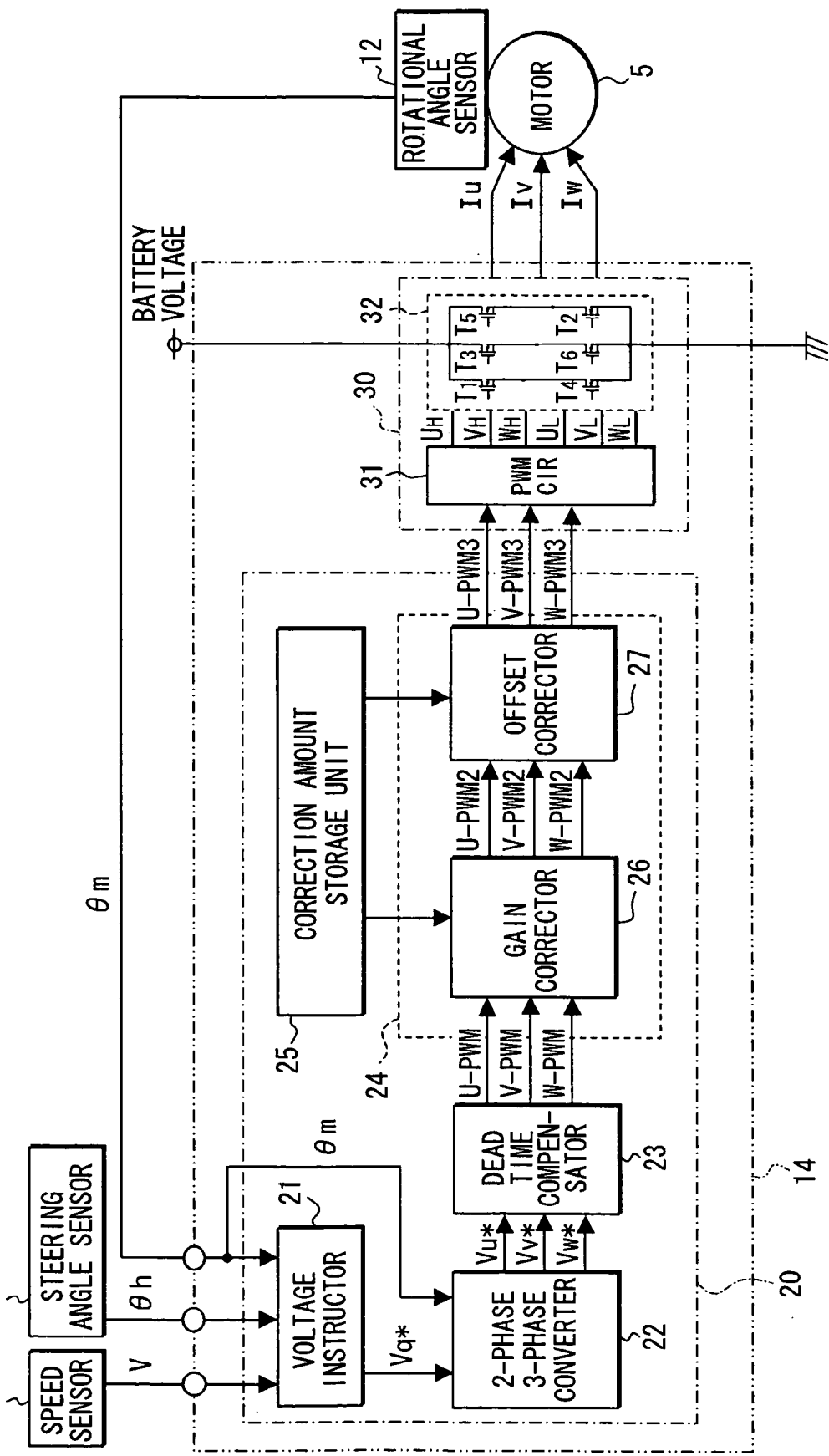
FIG. 2 is a block diagram showing the construction of a motor controller of an electric motor applied to the steering device.

A first embodiment will be described with reference to the drawings. FIG. 1 is a block diagram showing the construction of the steering device. FIG. 2 is a block diagram showing the construction of a motor controller for an electric motor (called as a motor) applied to a steering device. In this embodiment, a steering device having a transmission ratio varying mechanism for varying the rotational transmission ratio between the steering angle of a steering wheel and the turning angle of a steered wheel in accordance with a vehicle speed will be described as the steering device. For example, the rotational transmission ratio of the transmission ratio varying mechanism is controlled by the steering device so that the turning angle of the steered wheel is larger than the steering angle of the steering wheel when the vehicle is stopped or travels at a low speed, thereby reducing the operation amount of the steering wheel by the driver. On the other hand, when the vehicle travels at a high speed, the rotational transmission ratio is controlled so that the turning angle is smaller than the steering angle, thereby making the vehicle travel stably.

As shown in FIG. 1, the steering device 1 comprises a mechanical construction for transmitting the rotational force of the steering wheel 2 to the steered wheel 10 to turn the steered wheel 10, and an electrical construction for electrically controlling a part of the mechanical construction. The mechanical construction mainly comprises the steering wheel 2, an input shaft 3, the transmission ratio varying mechanism 4, an output shaft 7, a gear device 8 and a steered wheel 10, and the electrical construction mainly comprises a steering angle sensor 11, a rotational angle sensor 12, a vehicle speed sensor 13 and a computer (hereinafter referred to as ECU) 14.

One end of the input shaft 3 is connected to the steering wheel 2, and the other end of the input shaft 3 is connected to the input side of the transmission ratio varying mechanism 4. One end of the output shaft 7 is connected to the output side of the transmission ratio varying mechanism 4, and an input side of the rack and pinion type gear device 8 is connected to the other end of the output shaft 7. A rack shaft 9 is connected to the output side of the gear device 8, and the steered wheels 10 are connected to both the sides of the rack shaft 9 through tie rods (not shown).

The transmission ratio varying mechanism 4 comprises the motor 5 and a reducer 6 comprising a planetary gear mechanism, for example. The rotational transmission ratio G between the input shaft 3 and the output shaft 7 is varied by driving the reducer 6 with the motor 5, whereby the variation amount of the rotational angle of the output shaft 7 can be varied with respect to the variation amount of the rotational angle of the input shaft 3.

In this embodiment, a three-phase brushless motor having permanent magnet as the rotor and stator coils of three phases as the stator is used as the motor 5. The motor 5 used in the transmission ratio varying mechanism 4 is not limited to the three-phase brushless motor, and a three-phase induction motor may be used or a multi-phase motor of three phases or more (for example, 6-phase motor, 8-phase motor or the like) may be used.

As shown in FIG. 1, the steering angle sensor 11 is provided to the input shaft 3 to detect the rotational angle of the input shaft 3, that is, the steering angle θh of the steering wheel 2 and transmit the steering angle signal to ECU 14. The rotational angle sensor 12 is provided to the rotor of the motor 5 to detect the rotational angle θm (electric angle) of the rotor and transmit the rotational angle signal to ECU 14. ECU 14 calculates the rotational angle of the output shaft 7, that is, the output angle θp and the turning angle of the steered wheel 10 from the rotational angle θm and the rotational transmission ratio G. The vehicle speed sensor 13 detects the speed V of the vehicle and transmits the vehicle signal to ECU 14.

ECU 14 calculates the rotational transmission ratio G of the transmission ratio varying mechanism 4 from the vehicle speed V, and calculates the variation amount of the output angle θp on the basis of the rotational transmission ratio G and the variation amount of the steering angle θh. ECU 14 calculates a target rotational angle θmm of the rotor on the basis of the deviation between the present rotational angle θm of the rotor and the present output angle θp so that the output angle θp is equal to the variation amount thus calculated, and determines a motor voltage instruction value Vq* on the basis of the target rotational angle θmm. ECU 14 also functions as a motor controller, and generates motor current (Iu, Iv, Iw) corresponding to the sine waves of three phases which correspond to the instruction value Vq* and supplies the motor current to the stator coil of the motor 5.

As described above, when the vehicle is stopped or travels at a low speed, the steering device 1 controls the motor 5 to change the rotational transmission ratio G of the transmission ratio varying mechanism 4 and increase the turning angle of the steered wheel 10 with respect to the steering angle θh, thereby reducing the operation amount of the steering wheel 2 by the driver. On the other hand, when the vehicle travels at a high speed, the steering device 1 controls the motor 5 to change the rotational transmission ratio G of the transmission ration varying mechanism 4 and reduce the turning angle with respect to the steering angle θh, thereby making the vehicle travel stably.

Next, ECU 14 corresponding to the motor controller for controlling the driving of the motor 5 of the steering device 1 will be described in detail.

ECU 14 comprises a PWM signal calculator 20 and an inverter 30. The PWM signal calculator 20 calculates offset-corrected PWM signals of the respective phases (U_PWM3, V_PWM3, W_PMW3) on the basis of the steering angle θh input from the external, the rotational angle θm of the rotor and the vehicle speed V, and supplies the offset-corrected PWM signals to the inverter 30. The inverter 30 comprises a PWM circuit 31 and a switching circuit 32, generates three-phase motor current (Iu, Iv, Iw) on the basis of the off-set corrected signals (U_PWM3, V_PWM3, W_PMW3) and supplies to the stator coil of the motor 5.

The PWM circuit 31 is a pulse modulation circuit in which driving signals (UH, VH, WH, UL, VL, WL) which can turn on/off the switching circuit 32 are generated on the basis of the offset-corrected PWM signals (U_PWM3, V_PWM3, W_PMW3) of the respective phases calculated in the PWM signal calculator 20, and it supplies the driving signals to the switching circuit 32.

As shown in FIG. 2, the switching circuit 32 includes two switching elements for each phase of U, V, W, that is, the switching circuit 32 comprises a total of six switching elements such as MOSFETs (T1, T2, T3, T4, T5, T6), and carries out ON/OFF control on the respective MOSFETs (T1, T2, T3, T4, T5, T6) on the basis of the driving signals (UH, VH, WH, UL, VL, WL) to generate motor current (Iu, Iv, Iw) of each phase of U, V, W. IGBT may be used as the switching element.

As shown in FIG. 2, the PWM signal calculator 20 comprises a voltage instructor 21, a 2-phase 3-phase converter 22, a dead time compensator 23, a MOS corrector 24 corresponding to a correcting unit, and a correction amount storage portion 25 corresponding to a storage unit.

The voltage instructor 21 calculates a motor voltage instruction value Vq* for setting the rotational angle θm of the rotor to the target rotational angle θmm on the basis of the steering angle θh, the rotor rotational angle θm and the vehicle speed V which are input from the external of ECU 14. The instruction value Vq* is output to the 2-phase 3-phase converter 22. This instruction value Vq* is a voltage instruction value on the q axis.

The 2-phase 3-phase converter 22 carries out dq inverse conversion (3-phase conversion) on the motor voltage instruction value Vq* on the basis of the rotational angle θm of the motor 5 to calculate the voltage instruction values of the respective phases (Vu*, Vv*, Vw*). The voltage instruction values of the respective phases (Vu*, Vv*, Vw*) thus inversely-converted by the 2-phase 3-phase converter 22 are output as a U-phase voltage instruction value Vu*, a V-phase voltage instruction value Vv* and a W-phase voltage instruction value Vw* to the dead time compensator 23.

In order to prevent the MOSFETs of the upper and lower arms of each phase (T1 and T4, T3 and T6, T5 and T2) from being turned on simultaneously and thus short-circuited to each other, the inverter 30 for carrying out the PWM control is generally provided with a dead time at which both the driving signals of the MOSFETS of the upper and lower arms of each phase (T1 and T4, T3 and T6, T5 and T2) are turned off. By providing the dead time to the driving signal, the MOSFETs of the upper and lower arms (T1 and T4, T3 and T6, T5 and T2) can be prevented from being short-circuited to each other, however, torque pulsation occurs. Therefore, compensation control, that is, dead time compensating control to prevent occurrence of the torque pulsation is carried out.

The dead time compensator 23 corrects the voltage instruction values of the respective phases (Vu*, Vv*, Vw*) of an area where dead-time based current hardly flows, and the voltage instruction values thus corrected are converted to a duty ratio (%) by a predetermined calculation equation to achieve basic PWM signals (U_PWM, W_PWM, W_PWM). The basic PWM signals thus converted to the duty ratio (U_PWM, V_PWM, W_PWM) are output to the MOS corrector 24.

There is some dispersion in the electrical characteristic value among the MOSFETs (T1, T2, T3, T4, T5, T6) constituting the inverter 30. The electrical characteristic value is a threshold voltage Vth of MOSFET or the internal capacitance C (parasitic capacitance) of MOSFET, for example. If any dispersion exists in the electrical characteristic value, there would be a problem that even when the inverter 30 is PWM-driven on the basis of a predetermined PWM signal, the driving time of MOSFET is not coincident with the driving time corresponding to the predetermined PWM signal, and thus the waveforms of the motor current (Iu, Iv, Iw) of the respective phases generated are dispersed. As a result, a surge occurs in the torque current Iq, and thus torque variation occurs in the motor 5.

The MOS corrector 24 is connected to the dead time compensator 23, and the correction amount storage unit 25 is connected to the MOS corrector 24. The MOS corrector 24 has a function of correcting the basic PWM signals (U_PWM, V_PWM, W_PWM) input from the dead time compensator 23 on the basis of the correction amount stored in the correction amount storage unit 25, and outputting the basic PWM signals thus corrected to the inverter 30.

A gain (DGA_U, DGA_V, DGA_W) calculated by comparing reference motor current (corresponding to a reference sine wave) and motor current of each phase (Iu, Iv, Iw), and an offset value (DOA_U, DOA_V, DOA_W) for offsetting a level at which the polarity of the motor current is switched (hereinafter referred to as "polarity switching level") so that the absolute values of the peak values at the positive and negative polarity sides from the polarity switching level are coincident with each other are stored as the correction amount in the correction amount storage unit 25. The reference motor current described here is motor current needed to generate a predetermined motor output. A method of calculating the gain and the offset value will be described in detail later.

The MOS corrector 24 comprises a gain corrector 26 and an offset corrector 27. In the gain corrector 26, the basic PWM signal (U_PWM, V_PWM, W_PWM) is subjected to gain correction on the basis of the gain (DGA_U, DGA_V, DGA_W) to calculate gain-corrected PWM signals (U_PWM1, V_PWM1, W_PWM1). Thereafter, clamp processing is carried out on the gain-corrected PWM signal (U_PWM1, V_PWM1, W_PWM1) to calculate the clamp-processed PWM signal (U_PWM2, V_PWM2, W_PWM2).

In the offset corrector 27, the clamp-processed PWM signal (U_PWM2, V_PWM2, W_PWM2) is subjected to offset correction on the basis of the offset value (DOA_U, DOA_V, DOA_W) to calculate offset-corrected PWM signals (U_PWM3, V_PWM3, W_PWM3). The offset-corrected PWM signals (U_PWM3, V_PWM3, W_PWM3) thus calculated are output to the PWM circuit 31. A method of calculating the gain correction, the clamp processing and the offset correction will be described in detail later.

In this embodiment, the MOS corrector 24 for correcting the basic PWM signal (U_PWM, V_PWM, W_PWM) is provided to ECU 14, and thus the dispersion of the motor current of the respective phases (Iu, Iv, Iw) caused by the dispersion of the electrical characteristic values of MOS-FETs (T1, T2, T3, T4, T5, T6) can be overcome.

As described above, the basic PWM signals (U_PWM, V_PWM, W_PWM) are subjected to gain correction and clamp processing by the gain corrector 26 in the MOS corrector 24 to calculate the clamp-processed corrected PWM signal (U_PWM2, V_PWM2, W_PWM2). Subsequently, in the offset corrector 27 of the MOS corrector 24, the clamp-processed PWM signals (U_PWM2, V_PWM2, W_PWM2) are subjected to the offset correction to calculate the offset-corrected PWM signal (U_PWM3, V_PWM3, W_PWM3), and the dispersion of the electrical characteristic values of the MOSFETs (T1, T2, T3, T4, T5, T6) constituting the inverter 30 can be corrected.

As a result, the motor current of each phase (Iu, Iv, Iw) can be made coincident with the reference motor current, and also the waveforms of the motor current of the respective phases (Iu, Iv, Iw) can be made coincident with one another, so that the surge of the torque current Iq can be suppressed while outputting a predetermined motor output, and also the torque variation can be suppressed. Here, the reference sine wave is described as the current waveform, however, the reference sine wave may be a voltage waveform.

Furthermore, the reference motor current may be set to any one motor current (for example, Iu) of the motor current of the respective phases (Iu, Iv, Iw), and the gain (DGA_U, DGA_V, DGA_W) and the offset value (DOA_U, DOA_V, DOA_W) may be calculated so that the motor current of the other phases (for example, Iv, Iw) are coincident with the one motor current (for example, Iu), thereby correcting the basic PWM signal (U_PWM, V_PWM, W_PWM) in the MOS corrector 24. In this case, no desired motor output may be achieved. Therefore, it is necessary to provide a voltage adjuster for adjusting the motor output.

By applying the motor controller of this embodiment to the steering device 1, the vibration of the steering wheel 2 which is caused by the torque variation of the motor 5 can be suppressed, and the driver's steering feeling can be enhanced.

Furthermore, the motor controller described above may be applied to a electric power steering device used to apply the torque generated by the motor 5 to an auxiliary mechanism for assisting the steering force of the steering wheel 2 in place of the steering device 1 which changes the rotational transmission ratio G of the transmission ratio varying mechanism 4.

Figure 3:
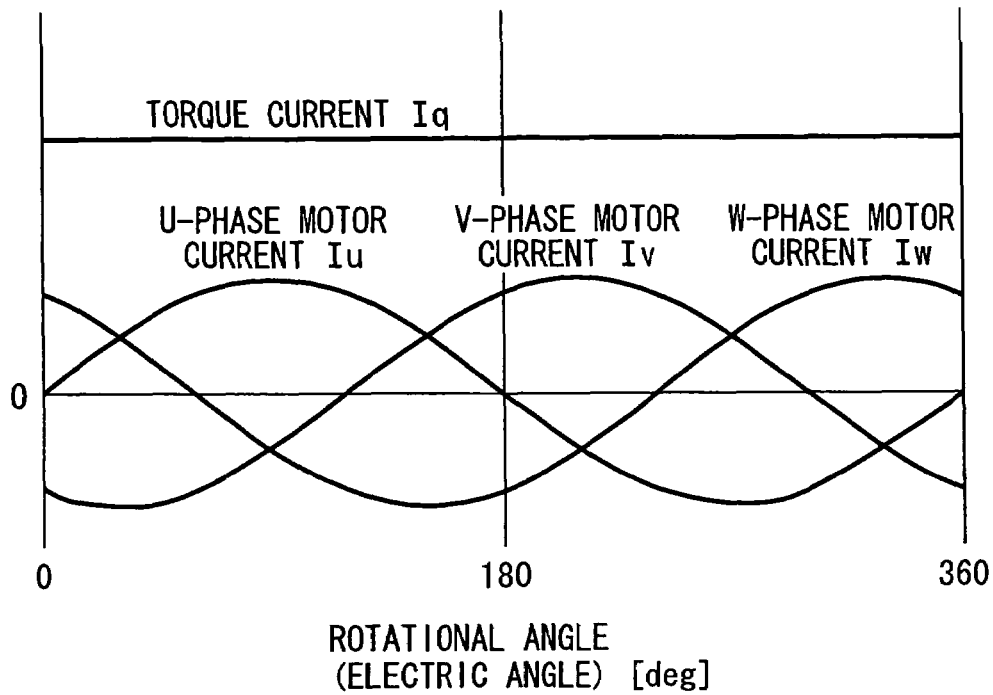
FIG. 3 is a diagram showing motor current of each phase and torque current when an inverter is PWM-operated on the basis of a PWM signal corrected in a MOS corrector.
Figure 4:
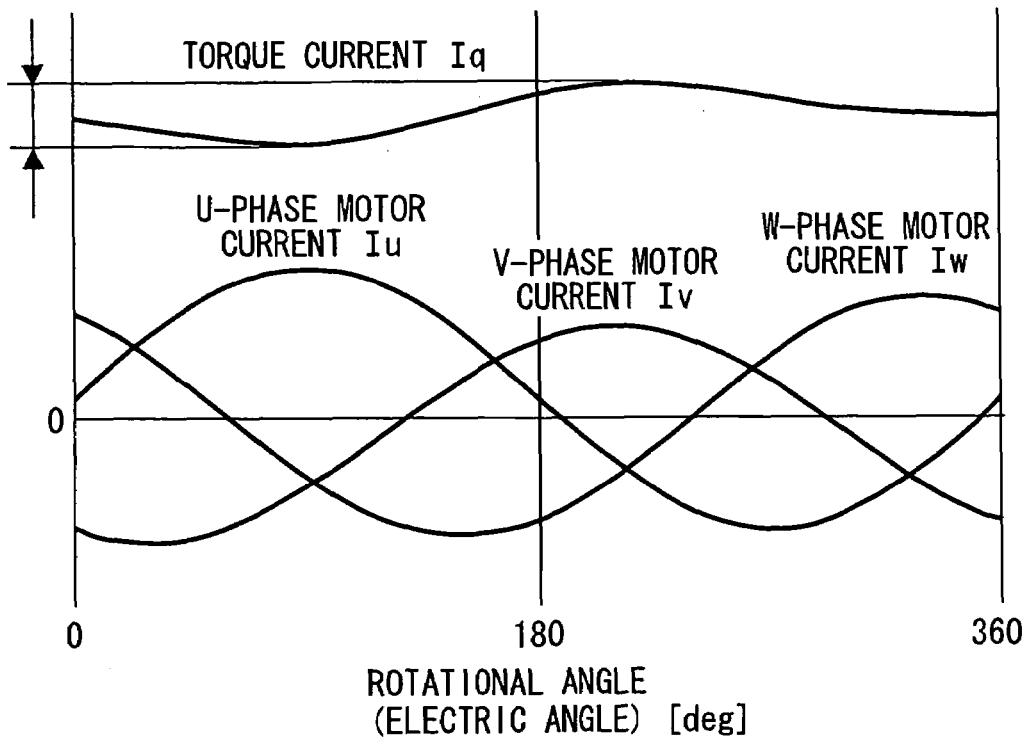
FIG. 4 is a diagram showing motor current of each phase and torque current when the inverter is PWM-operated without correcting the PWM signal in the MOS corrector.

Next, the procedure of the gain correction, the clamp processing and the offset correction in the gain corrector 26 and the offset corrector 27 will be described with reference to FIGS. 2 to 4. In the following description, the PWM signal of only the U-phase will be described. FIG. 3 is a diagram showing the motor current of each phase (Iu, Iv, Iw) and the torque current Iq when the inverter 30 is PWM-driven on the basis of the PWM signal corrected in the MOS corrector 24, and FIG. 4 is a diagram showing the motor current of each phase (Iu, Iv, Iw) and the torque current Iq when the inverter 30 is PWM-driven without correcting the PWM signal in the MOS corrector 24.

In the gain corrector 26, the gain correction is first carried out on the basis of the gain DGA_U to calculate the gain-corrected PWM signal U_PWM1, and then the clamp processing is carried out to calculate the clamp-processed PWM signal U_PWM2. The gain correction is carried out to make the wave height of the motor current Iu generated by the inverter 30 coincident with the wave height of the reference motor current. The clamp processing is carried out to make the polarity of the gain-corrected PWM signal U_PWM1 after the gain correction coincident with the polarity of the basic PWM signal U_PWM before the gain correction.

(For Basic PWM Signal U_PWM>0)

When the basic PWM signal U_PWM input from the dead time compensator 23 satisfies U_PWM>0, the gain correction is first carried out according to equation (1).

$$U\_PWM1 = U\_PWM + DGA\_U \quad (1)$$

Subsequently, on the basis of this result, the clamp processing is carried out according to equations (2) and (3).

$$U\_PWM2 = 0 \text{ (for } U\_PWM1 < 0) \quad (2)$$

$$U\_PWM2 = U\_PWM1 \text{ (for } U\_PWM1 \geq 0) \quad (3)$$

By carrying out the clamp processing as described above, the following phenomenon can be prevented. For example, in the case where the gain DGA_U is negative, when the gain correction based on equation (1) is carried out although the polarity of the basic PWM signal is in a positive area, the polarity of the gain-corrected PWM signal may become negative in the case of U_PWM<DGA_U.

When the polarity of the gain-corrected PWM signal is different from the polarity of the basic PWM signal as described above, the direction of the motor current is opposite to the current direction of the instruction and thus torque variation occurs. Therefore, by carrying out the clamp processing, the polarity of the gain-corrected PWM signal can be made coincident with the polarity of the basic PWM signal, and thus the above problem can be solved.

(For Basic PWM Signal U_PWM=0)

When the basic PWM signal U_PWM input from the dead time compensator 23 satisfies U_PWM=0, the gain correction is first carried out on the basis of the equation (4), and then the clamp processing is carried out on the basis of the equation (5).

$$U\_PWM1 = U\_PWM \quad (4)$$

$$U\_PWM2 = U\_PWM1 \quad (5)$$

(For Basic PWM Signal U_PWM<0)

When the basic PWM signal U_PWM input from the dead time compensator 23 satisfies U_PWM<0, the gain correction is first carried out on the basis of the equation (6).

$$U\_PWM1 = U\_PWM - DGA\_U \quad (6)$$

Subsequently, on the basis of this result, the clamp processing is carried out according to the equations (7) and (8).

$$U\_PWM2 = 0 \text{ (for } U\_PWM1 > 0) \quad (7)$$

$$U\_PWM2 = U\_PWM1 \text{ (for } U\_PWM1 \leq 0) \quad (8)$$

By carrying out the clamp processing as described above, the same problem as the case of basic PWM signal U_PWM>0 can be solved.

In the offset corrector 27, the offset correction is carried out on the clamp-processed PWM signal U_PWM2 input from the gain corrector 26 on the basis of the offset value DOA_U to calculate the offset-corrected PWM signal U_PWM3. The offset correction is carried out to offset the polarity switching level (i.e., the level at which the polarity of the motor current Iu is switched) so that the absolute value of the peak value at the positive polarity side of the motor current Iu from the polarity switching level is coincident with the absolute value of the peak value at the negative polarity side of the motor current Iu from the polarity switching level. The offset correction is carried out according to the equation (9). The offset-corrected and calculated offset-corrected PWM signal U_PWM3 is output to the PWM circuit 31.

$$U\_PWM3 = U\_PWM2 + PWM\_OFFSET + DOA\_U \quad (9)$$

The complementary PWM offset value PWM_OFFSET in the equation (9) is added when the inverter 30 is subjected to complementary PWM control, and the numeric value thereof is set to duty ratio 50%. When no complementary PWM control is carried out on the inverter 30, U_PWM3 may be calculated without adding the complementary PWM offset value PWM_OFFSET.

The gain-corrected PWM signal V_PWM1, the clamp-processed PWM signal V_PWM2 and the offset-corrected PWM signal V_PWM3 of the V-phase, and the gain-corrected PWM signal W_PWM1, the clamp-processed PWM signal W_PWM2 and the offset-corrected PWM signal W_PWM3 of the W-phase can be calculated by using the same calculation equations from the equations (1) to (9).

In the MOS corrector 24, the basic PWM signal (U_PWM, V_PWM, W_PWM) is corrected, and the inverter 30 is PWM-driven, whereby the waveforms of the motor current (Iu, Iv, Iw) of the respective phases can be made coincident with one another as shown in FIG. 3, so that the surge of the torque current Iq can be suppressed.

In this embodiment, the correction is carried out according the following procedure. That is, in the gain corrector 26, the basic PWM signal U_PWM is first corrected to calculate the clamp-processed PWM signal U_PWM2, and then in the offset corrector 27, the clamp-processed PWM signal U_PWM2 is corrected to calculate the offset-corrected PWM signal U_PWM3.

Accordingly, the judgment reference when the clamp processing is carried out can be set to the position where the polarities of all the phases (U, V, W) are switched, that is, set to zero, so that the processing can be prevented from being complicated and also the processing can be simplified.

Conversely, when the gain correction and the clamp processing are carried out after the offset correction is carried out, the judgment reference is added with the offset value of each phase, and thus the processing of the clamp processing is cumbersome.

Figure 5:
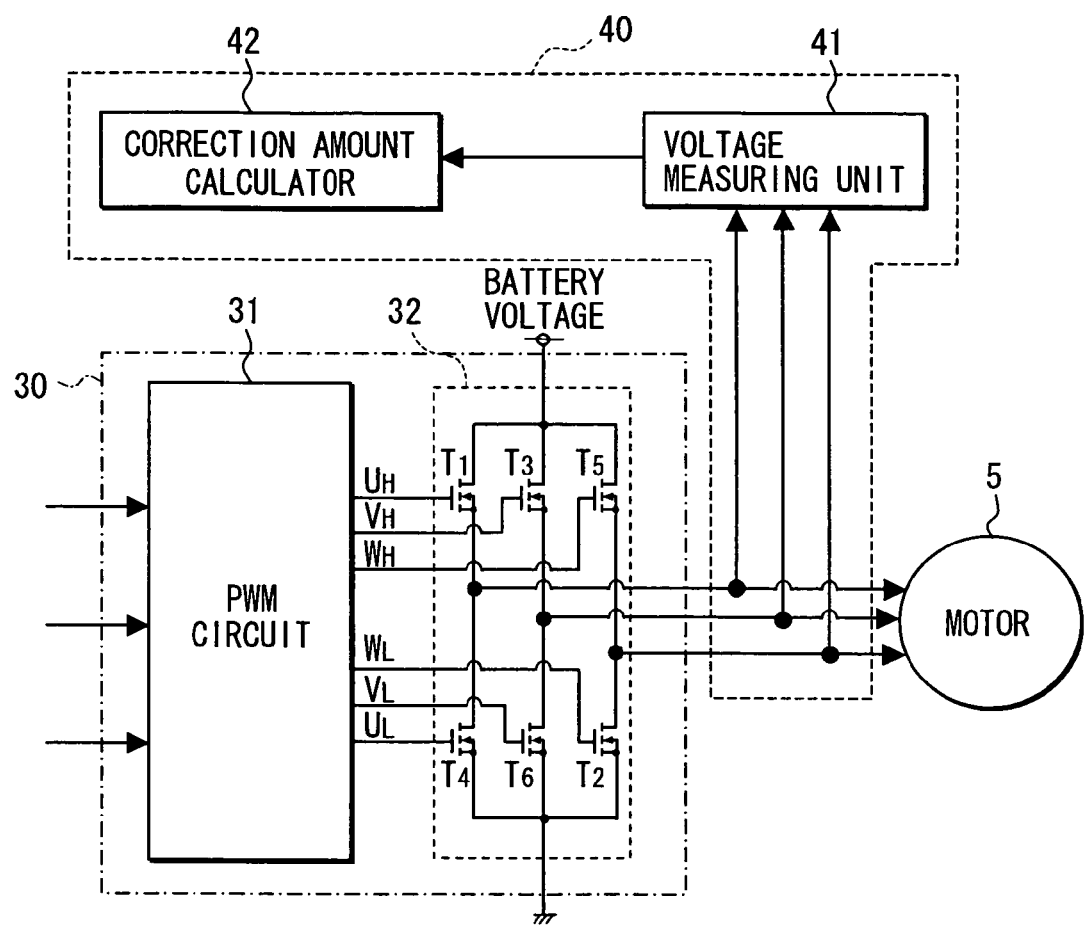
FIG. 5 is a block diagram showing the construction of a correction amount calculating device.
Figure 6:
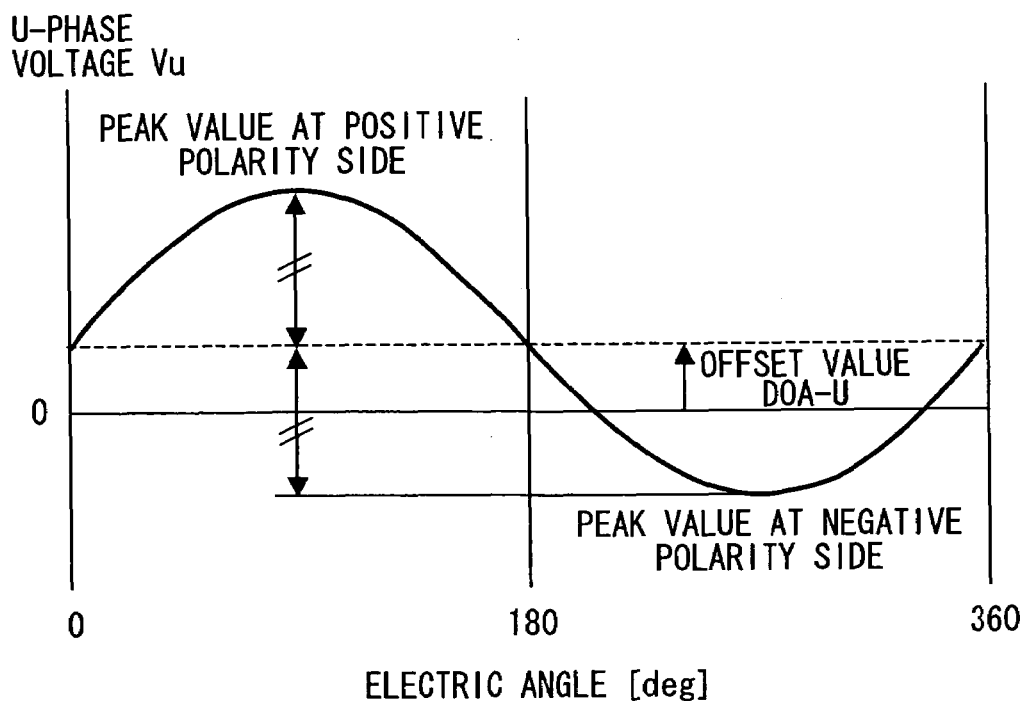
FIG. 6 is a diagram showing the relationship between a voltage waveform of U-phase and an offset value.
Figure 7:
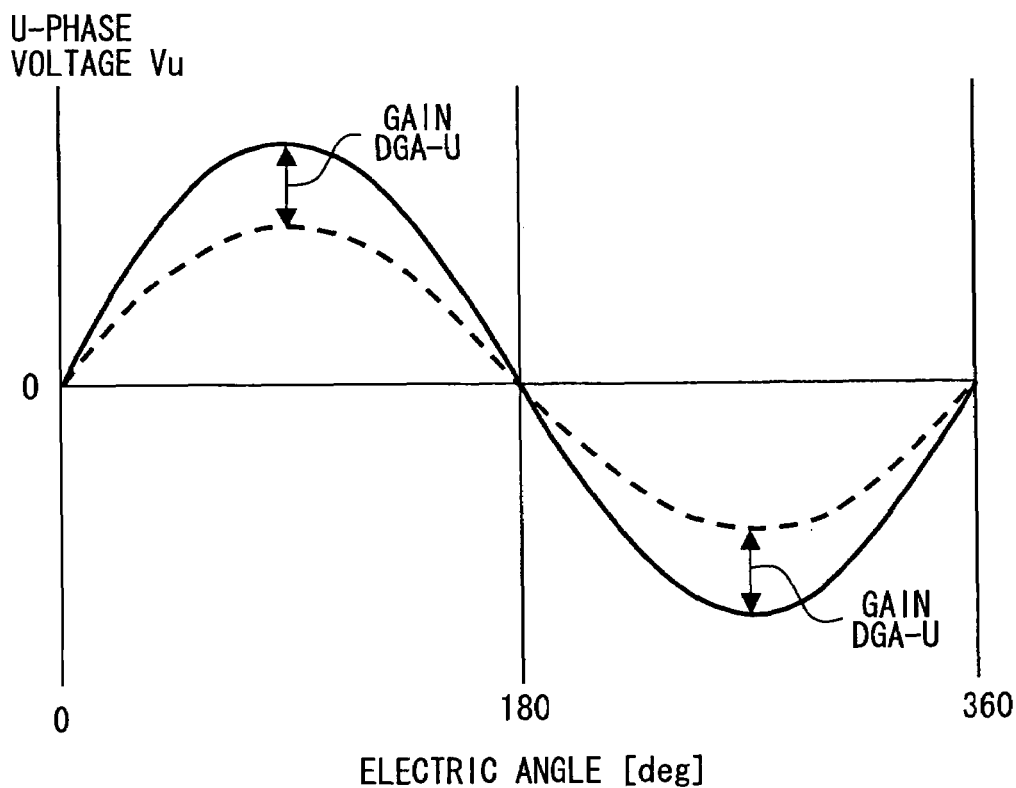
FIG. 7 is a diagram showing the relationship between the U-phase voltage waveform and a reference voltage waveform.

Next, a method of calculating the gain (DGA_U, DGA_V, DGA_W) and the offset value (DOA_U, DOA_V, DOA_W) as the correction amount stored in the correction amount storage unit 25 will be described in detail with reference to FIGS. 5 to 7. FIG. 5 is a block diagram showing the construction of the correction amount calculating device. FIG. 6 is a diagram showing the relationship between the voltage waveform of U-phase and the offset value, and FIG. 7 is a diagram showing the relationship between the U-phase voltage waveform and the reference voltage waveform. In the following description, the method of calculating the correction amount of only U-phase will be described.

As shown in FIG. 5, the correction amount calculating device 40 for calculating the correction amount (gain, offset value) stored in the correction amount storage unit 25 comprises a voltage measuring unit 41 for measuring the sine waves of the respective phases generated in the inverter 30 as voltage waveforms, and a correction amount calculator 42, and the correction amount is calculated on the basis of the voltage waveform.

The sine wave of each phase may be measured as a current waveform, and the correction amount may be calculated in the correction amount calculator 42. Generally, it is easier to measure the voltage waveform than to measure the current waveform, and thus this embodiment measures the voltage waveform.

When the gain DGA_U and the offset value DOA_U are carried out, the calculation concerned is carried out under the state that the rotor of the motor 5 is stopped. If the rotation of the rotor is not stopped, an induced voltage which progresses in phase by 90 degrees with respect to the interlinkage magnetic field would occur in the stator coil, so that the voltage waveforms of the respective phases generated by the inverter 30 are displaced. If the rotation of the rotor is stopped and the correction amount is calculated, it is unnecessary to pay attention to the induced voltage occurring in the stator coil, and thus the correction amount can be easily calculated.

Before the motor 5 is shipped, the correction amount calculator 40 is connected to the wire between the inverter 30 and the motor 5 on the manufacturing line in a factory, for example, and calculates the correction amount. The correction amount thus calculated is stored in the correction amount storage unit 25 in ECU 14 by a device which can write data into the correction amount storage unit 25. In this embodiment, the correction amount is calculated on the manufacturing line in the factory, and thus the surrounding atmosphere, that is, the temperature condition can be easily fixed, and thus the gain and the offset value can be accurately calculated. This prevents the electrical characteristic value of MOSFET (T1, T2, T3, T4, T5, T6) from varying in accordance with the temperature condition.

Furthermore, the correction amount calculator 40 may be provided on the manufacturing line in the factory, and thus it is unnecessary to provided a correction amount calculator device 40 to each motor 5, so that ECU 14 can be prevented from being complicated.

First, the processing of calculating the offset value DOA_U will be described with reference to FIG. 6. This processing calculates an offset value DOA_U for offsetting a level containing a zero cross point (a point at which the polarity of the voltage is varied) of a voltage waveform being measured so that the absolute value of the value from the level concerned to the peak value at the positive polarity side is equal to the absolute value of the value from the level concerned to the peak value at the negative polarity side (see FIG. 6).

Next, the processing of calculating the gain DGA_U will be described with reference to FIG. 7. In this processing, the voltage waveform (broken line) after the level concerned is offset by the offset value DOA_U is compared with the reference voltage waveform (solid line) corresponding to the reference sine wave to calculate the gain DGA_U. The gain DGA_U is calculated on the basis of the deviation between the peak value of the positive polarity side of the voltage waveform after the offset and the peak value at the positive polarity side of the reference voltage waveform, or the deviation between the peak value at the negative polarity side of the voltage waveform after the offset and the peak value at the negative polarity side of the reference voltage waveform (see FIG. 7).

In this embodiment, the processing of calculating the gain DGA_U and the offset value DOA_U is carried out on the basis of the peak value at the positive or negative polarity side of the voltage waveform which has the strongest effect on the torque of the motor 5. Therefore, the voltage waveform of each phase can be made coincident with the reference voltage waveform easily and efficiently, and the surge of the torque current Iq can be suppressed.

Furthermore, the voltage waveform corrected by the dead time compensator 23 has the feature that the distortion thereof is largest in the neighborhood of the zero cross point and smallest in the neighborhood of the peak value. From this viewpoint, the offset value and the gain as the correction amount are calculated on the basis of the peak value at the positive or negative polarity side at which the distortion of the voltage waveform corrected by the compensator 23 is relatively small, and thus the voltage waveform of each phase and the reference voltage waveform can be made coincident with each other easily and efficiently even in the motor controller having the dead time compensator 23, and the surge of the torque current Iq can be suppressed.

The correction amount calculator 40 may be provided in ECU 14 of each motor 5. Accordingly, the correction amount can be calculated every time the motor 5 is started, and the latest correction amount can be stored in the correction amount storage unit 25, thereby dealing with the aged deterioration of the electrical characteristic values of MOSFETs (T1, T2, T3, T4, T5, T6).

Second Embodiment

A second embodiment will be described. In this embodiment, the inverter 30 is constructed by the MOSFETs (T1, T2, T3, T4, T5, T6) having electrical characteristic values within a predetermined range.

MOSFETs (T1, T2, T3, T4, T5, T6) are grouped into plural groups among which the range of the threshold voltage Vth of MOSFET or the range of the parasitic capacitance C of MOSFET is different, and the inverter 30 is constructed by the MOSFETs (T1, T2, T3, T4, T5, T6) in the same group. Accordingly, the dispersion of the electrical characteristic values of the MOSFETs (T1, T2, T3, T4, T5, T6) constituting the inverter 30 can be suppressed, and the waveforms of the respective phases generated by the inverter 30 can be made coincident with one another, so that the surge of the torque current Iq can be suppressed and the torque variation of the motor 5 can be suppressed.

It is unnecessary to carry out the grouping of the MOSFETs (T1, T2, T3, T4, T5, T6) on the basis of any one of the threshold voltage Vth and the parasitic capacitance C, and the grouping may be carried out on the basis of both the threshold value Vth and the parasitic capacitance C. Accordingly, the dispersion of the electrical characteristic values of the MOSFETs (T1, T2, T3, T4, T5, T6) can be suppressed.

Likewise, with respect to the gate resistors connected to the gate terminals of the MOSFETs, the capacitors, etc., the electrical characteristic values of these elements are set to be close to one another.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A motor controller comprising:
an inverter including plural switching elements that are subjected to PWM control to generate sine waves of plural phases;
a motor including a stator coil supplied with the sine waves thus generated so that rotational magnetic field is generated in the stator coil, and a rotor that is rotationally driven by the action of the rotational magnetic field generated by the stator coil;
a storage unit for detecting the sine waves of the respective phases generated in the inverter and storing a correction amount for each phase that is calculated on the basis of the detection result so that the sine waves of the respective phases are coincident with one another; and
a correcting unit for correcting a PWM signal for carrying out the PWM control on the switching elements on the basis of the correction amount thus calculated,
wherein the motor controller is implemented in a steering device for driving a motor on the basis of a steering state detected by a steering state detecting unit, and actuating a transmission ratio varying mechanism for varying the transmission ratio between a steering angle of a steering wheel and a turning angle of a steered wheel, or an auxiliary mechanism for assisting the steering force of the steering wheel.

2. The motor controller according to claim 1, wherein the correction amount is calculated so that the sine wave of each phase is coincident with a reference sine wave different from the sine waves of the respective phases.

3. The motor controller according to claim 1, wherein the correction amount is calculated so that one of the sine waves of the respective phases is set as a reference sine wave and the sine waves of the other phases are coincident with the reference sine wave.

4. The motor controller according to claim 2, wherein the correction amount contains an offset value for offsetting a level at which the polarity of the sine wave of each phase is changed so that the absolute values of the peak values at positive and negative polarity sides of the sine wave from the level concerned are substantially equal to each other, and a gain that is set so that the peak values at the positive and negative polarity sides of the sine wave are coincident with the respective peak values of the reference sine wave.

5. A motor controller comprising:
an inverter including plural switching elements that are subjected to PWM control to generate sine waves of plural phases;
a motor including a stator coil supplied with the sine waves thus generated so that rotational magnetic field is generated in the stator coil, and a rotor that is rotationally driven by the action of the rotational magnetic field generated by the stator coil;
a storage unit for detecting the sine waves of the respective phases generated in the inverter and storing a correction amount for each phase that is calculated on the basis of the detection result so that the sine waves of the respective phases are coincident with one another; and
a correcting unit for correcting a PWM signal for carrying out the PWM control on the switching elements on the basis of the correction amount thus calculated,
wherein the correction amount is calculated on the basis of the sine wave under the state that the rotor of the motor is locked.

6. The motor controller according to claim 5, wherein the correction amount is calculated only once before shipping and stored in the storage unit, and the correcting unit corrects the PWM signal on the basis of the correction amount at all times.

7. The motor controller according to claim 5, further comprising a correction amount calculating unit for calculating the correction amount, wherein the correction amount is calculated by the correction amount calculating unit and stored in the storage unit every time the motor is started, and the correcting unit corrects the PWM signal on the basis of the correction amount.

8. The motor controller according to claim 4, wherein the correcting unit carries out gain-based gain correction on the PWM signal to calculate a gain-corrected PWM signal, and when the polarity of the gain-corrected PWM signal is different from the polarity of the PWM signal before the gain correction, the correcting unit carries out clamp processing for nullifying the value of a portion at which the polarity of the gain-corrected PWM signal is different, thereby calculating a clamp-processed PWM signal.

9. The motor controller according to claim 8, wherein after the clamp-processed PWM signal is calculated, the correcting unit carries out offset correction based on an offset value to calculate an offset-corrected PWM signal.

10. A motor controller comprising:
an inverter including plural switching elements that are subjected to PWM control to generate sine waves of plural phases;
a motor including a stator coil supplied with the sine waves thus generated so that rotational magnetic field is generated in the stator coil, and a rotor that is rotationally driven by the action of the rotational magnetic field generated by the stator coil;
a storage unit for detecting the sine waves of the respective phases generated in the inverter and storing a correction amount for each phase that is calculated on the basis of the detection result so that the sine waves of the respective phases are coincident with one another; and
a correcting unit for correcting a PWM signal for carrying out the PWM control on the switching elements on the basis of the correction amount thus calculated,
wherein the sine wave is a voltage value output to the terminal of each phase.

11. The motor controller according to claim 1, wherein the sine wave is a current value output to each phase.

12. A motor controller comprising:
an inverter including plural switching elements that are subjected to PWM control to generate sine waves of plural phases; and
a motor including a stator coil supplied with the sine waves thus generated so that rotational magnetic field is generated in the stator coil, and a rotor that is rotationally driven by the action of the rotational magnetic field generated by the stator coil, wherein the switching elements are grouped in accordance with a predetermined range of electrical characteristic values, and the inverter is constructed by using the switching elements belonging to the same groups,
wherein the motor controller is implemented in a steering device for driving a motor on the basis of a steering state detected by a steering state detecting unit, and actuating a transmission ratio varying mechanism for varying the transmission ratio between a steering angle of a steering wheel and a turning angle of a steered wheel, or an auxiliary mechanism for assisting the steering force of the steering wheel.

13. A motor controller comprising:
a correcting unit for correcting basic PWM signals generated by a dead time compensator to thereby prevent dispersion of waveforms of the motor current (Iu, Iv, Iw) of the respective phases and resultant torque variation n the motor, wherein the correcting unit comprises a gain corrector for subjecting the basic PWM signals to gain correction based on a gain value stored in a correction amount storage unit and subjecting the gain corrected signal to clamp processing; and an offset corrector for subjecting the clamp processed PWM signal to an offset correction based upon an offset value stored in the correction amount storage unit,
wherein the offset value offsets a level containing a zero cross point of voltage waveforms of the PWM signals being measured so that an absolute value from the zero cross point to a peak value at positive polarity side is equal to an absolute value the zero cross point to a peak value at the negative polarity side, wherein the gain value is a measure of deviation between peak value of the positive polarity side of the voltage waveform after the offset and peak value at positive polarity side of a reference voltage waveform, or the deviation between peak value at the negative polarity side of the voltage waveform after the offset and peak value at negative polarity side of the reference voltage waveform.

* * * * *